(12) United States Patent
Zdeb (10) Patent No.: US 7,621,382 B2
(45) Date of Patent: Nov. 24, 2009

(54) SHOCK ABSORBER

(75) Inventor: David T. Zdeb, Ypsilanti, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 149 days.

(21) Appl. No.: 11/477,115

(22) Filed: Jun. 28, 2006

(65) Prior Publication Data

US 2008/0000738 A1    Jan. 3, 2008

(51) Int. Cl.
*F16F 9/00*    (2006.01)
(52) U.S. Cl. ............ 188/315; 188/322.16; 188/322.13; 188/297; 188/313; 188/314; 188/322.17; 188/322.18
(58) Field of Classification Search ................. 188/315, 188/322.16, 322.13, 297, 313, 314, 322.17, 188/322.18
See application file for complete search history.

(56) References Cited

U.S. PATENT DOCUMENTS

| | | | | |
|---|---|---|---|---|
| 3,150,683 A | * | 9/1964 | Carolan | 137/493 |
| 3,520,384 A | * | 7/1970 | Nicholls | 188/269 |
| 4,105,193 A | * | 8/1978 | Long, Jr. | 267/64.21 |
| 4,364,457 A | * | 12/1982 | Wossner et al. | 188/322.17 |
| 4,485,899 A | * | 12/1984 | Grundei | 188/277 |
| 4,527,673 A | * | 7/1985 | Szcupak | 188/269 |
| 4,795,009 A | | 1/1989 | Tanahashi et al. | |
| 4,809,829 A | | 3/1989 | Hummel et al. | |
| 4,987,826 A | * | 1/1991 | Deppert et al. | 92/168 |
| 4,989,701 A | * | 2/1991 | Yamaoka et al. | 188/322.17 |
| RE33,715 E | * | 10/1991 | Miura | 188/322.17 |
| 5,167,419 A | * | 12/1992 | Robertson | 277/552 |
| 5,174,551 A | * | 12/1992 | Mintgen | 267/120 |
| 5,237,971 A | * | 8/1993 | Worsley | 277/502 |
| 5,291,974 A | * | 3/1994 | Bianchi | 188/322.17 |
| 5,454,455 A | * | 10/1995 | Kundmuller et al. | 188/321.11 |
| 5,522,486 A | * | 6/1996 | Fulks et al. | 188/315 |
| 5,598,903 A | | 2/1997 | Richardson | |
| 5,740,890 A | * | 4/1998 | Forster | 188/322.2 |
| 5,944,321 A | * | 8/1999 | Niebling et al. | 277/549 |
| 5,954,167 A | | 9/1999 | Richardson et al. | |
| 5,996,746 A | | 12/1999 | Turner et al. | |
| 6,086,059 A | * | 7/2000 | Runesson et al. | 267/64.11 |
| 6,164,424 A | | 12/2000 | Girvin et al. | |
| 6,244,398 B1 | | 6/2001 | Girvin et al. | |
| 6,253,889 B1 | | 7/2001 | Shirley et al. | |
| 6,334,516 B1 | | 1/2002 | Shirley et al. | |

(Continued)

FOREIGN PATENT DOCUMENTS

JP    61-144440    *    7/1986

*Primary Examiner*—Robert A Siconolfi
*Assistant Examiner*—James K Hsiao
(74) *Attorney, Agent, or Firm*—Young Basile (57) ABSTRACT

A dampening mechanism is described having a pressure tube defining a working chamber between a rod guide proximate a first end and an end cap proximate a second end. A piston is disposed within the pressure tube and divides the working chamber into an upper working chamber and a lower working chamber. A piston rod is secured to the piston. A reservoir tube surrounds the pressure tube defining a reservoir chamber between the reservoir tube and the pressure tube. At least one passage is disposed through the pressure tube between the reservoir chamber and the working chamber and a bypass valve is disposed between the piston and the at least one passage.

19 Claims, 6 Drawing Sheets

U.S. PATENT DOCUMENTS

| | | |
|---|---|---|
| 6,460,664 B1 | 10/2002 | Steed et al. |
| 6,581,948 B2 | 6/2003 | Fox |
| 6,604,751 B2 | 8/2003 | Fox |
| 6,637,557 B2 | 10/2003 | Oliver et al. |
| 6,651,788 B1 | 11/2003 | Wohlfarth |
| 6,880,684 B1 | 4/2005 | Evans et al. |
| 6,959,796 B2 | 11/2005 | DeGronckel et al. |
| 7,011,193 B2 | 3/2006 | Lemmens et al. |
| 2004/0090020 A1 | 5/2004 | Braswell |
| 2004/0163905 A1 | 8/2004 | Braswell et al. |
| 2004/0211631 A1 | 10/2004 | Hsu |
| 2004/0222056 A1 | 11/2004 | Fox |
| 2005/0023093 A1* | 2/2005 | Leiphart et al. ............. 188/283 |
| 2005/0225050 A1 | 10/2005 | Mizuno |
| 2006/0011426 A1 | 1/2006 | Sas et al. |
| 2006/0065496 A1 | 3/2006 | Fox |
| 2006/0081431 A1 | 4/2006 | Breese |

* cited by examiner

SHOCK ABSORBER

TECHNICAL FIELD

Described herein is a shock absorber, and more particularly, a shock absorber for improving vibration dampening.

BACKGROUND

Shock absorbers dampen or control motion in a vehicle. In conjunction with a vehicle suspension system, shock absorbers control vibrations that occur during driving. If vehicle vibration is unrestrained, vehicle springs continue expanding and contracting until all the energy is absorbed leading to a rough ride. Further, uncontrolled motion from shock creates a great deal of wear on the suspension and steering systems. Shock absorbers minimize this effect.

To absorb unwanted vibrations, shock absorbers are generally disposed between the vehicle body and the suspension system of the vehicle. A piston is located within a pressure tube of the shock absorber, with the piston being secured to the vehicle body by way of a piston rod and the pressure tube being secured to the suspension portion of the vehicle. Because the piston is able, through valving, to limit the flow of damping fluid between opposite sides of the piston, when the shock absorber is compressed or extended, the shock absorber is able to produce a damping force which counteracts the unwanted vibration that would otherwise be transmitted from the vehicle body to the suspension portion.

A shock absorber is a velocity-sensitive hydraulic dampening device. The faster the shock absorber moves, the more resistance it has to the movement. This allows it to automatically adjust to various road conditions. The shock absorber works on a principle of fluid displacement on both its compression and extension cycles. The typical shock absorber has more resistance during its extension cycle then its compression cycle. The extension cycle controls motions of the vehicle body sprung weight. The compression cycle controls the same motions of the unsprung weight.

Typical shock absorbers are valved to offer roughly equal resistance to suspension movement upward (jounce) and downward (rebound). The proportion of a shock absorber's ability to resist these movements is indicated by a numerical ratio that describes what percent of the shock absorber's total control is compression and what percent is extension. For example, typical passenger vehicles use shock absorbers valved at 50% jounce and 50% rebound (50/50). Racing vehicles, on the other hand, use shock valved at about 90% jounce and 10% rebound (90/10). Small vehicles, because of their light-weight and soft springs, require more control in both jounce and rebound in the shock absorbers. Damping rates within the shock absorbers are controlled by the size of the piston, the size of the orifices, and the closing force of the valves.

Figure 1:
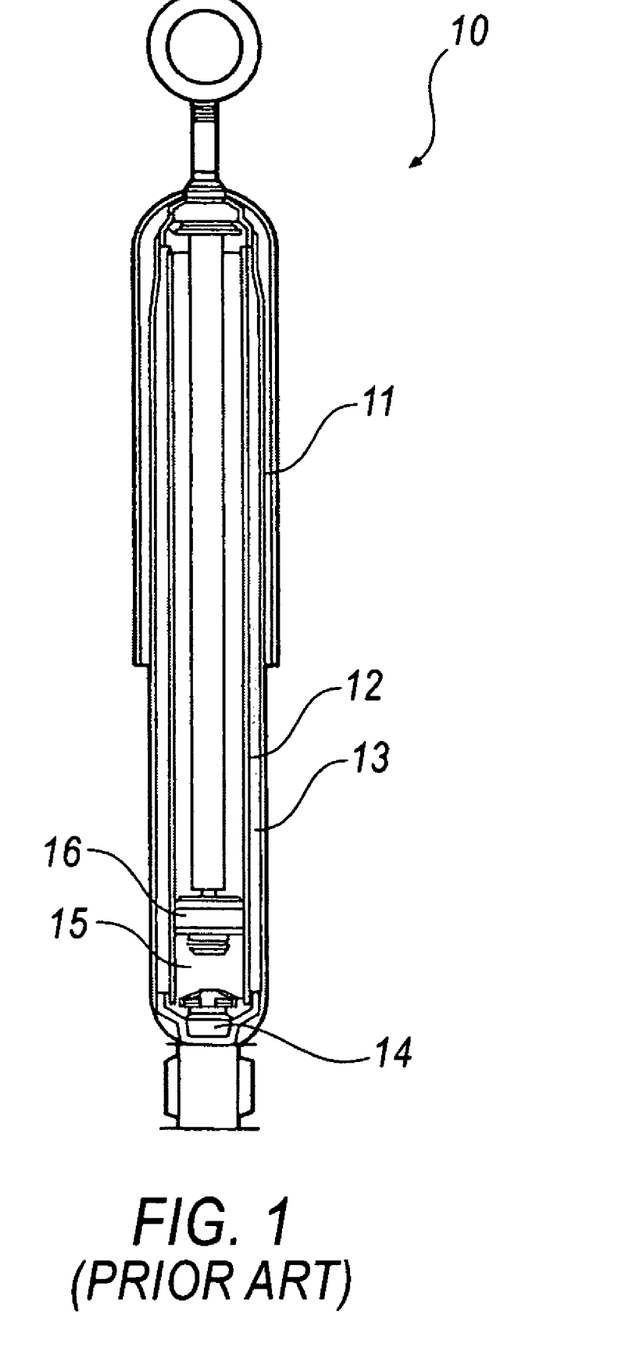
FIG. 1 is a cross-sectional view of a prior art dual-tube shock absorber.

Conventional hydraulic shock absorbers are available in two styles: a single-tube shock absorber and a dual-tube shock absorber. As illustrated in FIG. 1, the dual-tube shock absorber 10 includes an outer tube called a reserve tube 11 that substantially covers an inner tube called the pressure tube 12. The dual-tube shock absorber 10 includes a fluid reservoir 13 disposed between the pressure tube 12 and the reserve tube 11. A base valve 14 is located between a lower working chamber 15 and the fluid reservoir 13 to limit the flow of fluid between the lower working chamber 15 and the fluid reservoir 13 to produce a damping force, which also counteracts the unwanted vibration that would otherwise be transmitted from the suspension system to the vehicle body. The greater the degree to which the flow of fluid within the shock absorber is restricted by a piston 16 and/or the base valve 14, the greater the damping forces are generated by the shock absorber 10. Thus, a highly restricted flow of fluid would produce a firm ride while a less restricted flow of fluid would produce a soft ride.

In selecting the amount of damping that the shock absorber is to provide, at least three vehicle performance characteristics are considered. These three characteristics are ride comfort, vehicle handling, and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred.

Vehicle handling is related to the variation in the vehicle's attitude including the roll, pitch and yaw. For optimum vehicle handling, relatively large damping forces, or a firm ride, are required to avoid excessively rapid variations in the vehicle's attitude during cornering, acceleration, and deceleration.

Finally, road holding ability is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed with multi-force damping force generating devices to generate the desired damping forces in relation to the various vehicle performance characteristics. Shock absorbers have been developed to provide different damping characteristics depending on the distance or the speed at which the piston moves within the pressure tube. Because of the exponential relation between pressure drop and flow rate, it is a difficult task to obtain a damping force at relatively low piston velocities, particularly at velocities near zero.

The continued development of hydraulic dampers includes the development of multi-force damping force generating devices, which are simpler to manufacture, can be manufactured at a lower cost, and which improve the desired force generating characteristics.

One problem with typical shock absorbers is that they do not damp out smaller, generally smooth road vibrations, which are a source of discomfort to the occupants of the vehicle. Moreover, the typical shock absorbers encourage a higher low velocity dampening force, which impairs vehicle response to smooth road vibrations.

Therefore, it would be desirable to provide a shock absorber that uses the shock absorber internal pressure differential, which is related to a combination of displacement, velocity, and acceleration for valve regulation in controlling dampening for generally smooth road vibrations.

SUMMARY

In an illustrative embodiment, a dampening mechanism is employed having a pressure tube defining a working chamber between a rod guide proximate a first end and an end cap proximate a second end. A piston is disposed within the pressure tube and divides the working chamber into an upper working chamber and a lower working chamber. A piston rod is secured to the piston. A reservoir tube surrounds the pressure tube defining a reservoir chamber between the reservoir tube and the pressure tube. At least one passage is disposed through the pressure tube between the reservoir chamber and the working chamber and a bypass valve is disposed between the piston and the at least one passage.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

Figure 2:
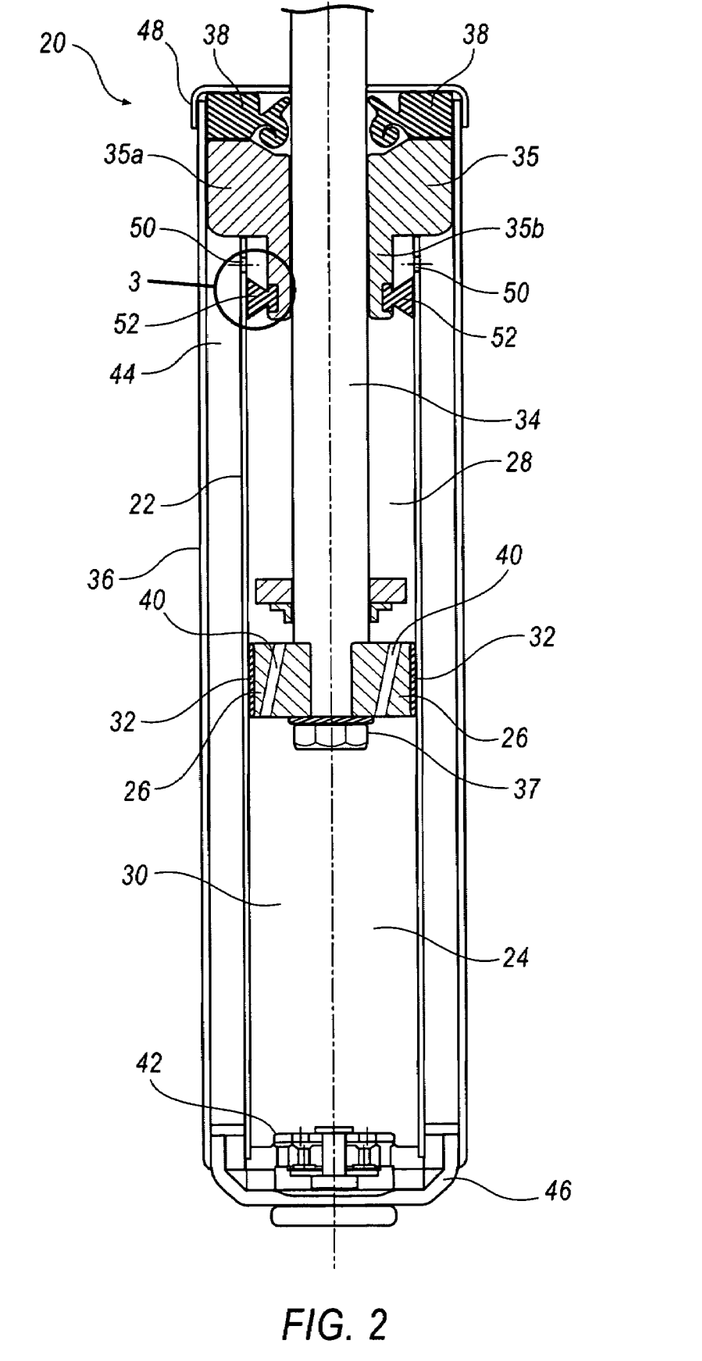
FIG. 2 is a cross-sectional view of one embodiment of a dual-tube shock absorber.

Referring now to FIG. 2, one embodiment of a shock absorber 20 is illustrated in a cross-sectional view. While FIG. 2 illustrates one embodiment of the shock absorber 20, it is to be understood that the shock absorber 20 may be any dampening mechanism. The shock absorber 20 includes a pressure tube 22 defining a working chamber 24. A piston 26 is slidably disposed within the pressure tube 22 and divides the working chamber 24 into an upper working chamber 28 and a lower working chamber 30. A seal 32 is disposed between the piston 26 and the pressure tube 22 to permit sliding movement of piston 26 with respect to pressure tube 22 without generating undue frictional forces as well as sealing upper working chamber 28 from lower working chamber 30. A piston rod 34 is attached to the piston 26 and extends through upper working chamber 28 and through a rod guide 35, which closes the upper end of both pressure tube 22 and a reservoir tube 36. The piston 26 is secured to the piston rod 34 by a securing mechanism 37. By way of example, the securing mechanism 37 is illustrated as a typical nut screwed onto the piston rod 34 biasing the piston 26 upwards and securing the piston 26 between the piston rod 34 and the securing mechanism 37.

The pressure tube 22 is disposed generally within the reservoir tube 36. A sealing system 38 seals the interface between rod guide 35, pressure tube 22, reservoir tube 36 and piston rod 34. In one example of the shock absorber 20, the end of piston rod 34 opposite to piston 26 is adapted to be secured to a vehicle body (not shown).

Valving 40 in piston 26 controls the movement of fluid between upper working chamber 28 and lower working chamber 30 during movement of the piston 26 within pressure tube 22. Because the piston rod 34 extends through upper working chamber 28 and not lower working chamber 30, movement of piston 26 with respect to pressure tube 22 causes a difference in the amount of fluid displaced in upper working chamber 28 than the amount of fluid displaced in lower working chamber 30. This difference in the amount of fluid displaced is known as the "rod volume" and it flows through base valve assembly 42.

The reservoir tube 36 surrounds pressure tube 22 to define a reservoir chamber 44 disposed between the tubes 36, 22. The bottom portion of reservoir tube 36 is closed by an end cap 46, which is adapted to be in mechanical communication with a vehicle suspension system (not shown). An upper portion 48 of reservoir tube 36 is secured to the rod guide 35 and the sealing system 38. The base valve assembly 42 is disposed between lower working chamber 30 and reservoir chamber 44 to control the flow of fluid between the two chambers 30, 44. When the shock absorber 20 extends in length (rebound), an additional volume of fluid is needed in lower working chamber 30 due to the "rod volume" concept. Thus, fluid will flow from the reservoir chamber 44 to the lower working chamber 30 through the base valve assembly 42. When the shock absorber 20 compresses in length (jounce), an excess volume of fluid must be removed from lower working chamber 30 due to the "rod volume" concept. Thus, fluid will flow from lower working chamber 30 to the reservoir chamber 44 through the base valve assembly 42.

In order to dampen out smaller, generally smooth road vibrations, at least one orifice 50 or passage having a predetermined size and shape is placed at a predetermined location in the pressure tube 22. The size, shape, and location of the orifice 50 depends on the user's requirements in selecting the desirable amount of fluid and fluid flow rate between the reservoir chamber 44 and the upper working chamber 28. Further, a bypass valve 52 is disposed proximate the orifice 50 for using the shock absorber's internal pressure differential in dampening smaller, generally smooth road vibrations as further discussed below. A passage side of the bypass valve 52 is disposed between the bypass valve 52 and the orifice 50. A piston side of the bypass valve 52 is disposed between the bypass valve 52 and the working chamber 28.

The rod guide 35 includes a first portion 35a and a second portion 35b. The first portion 35a is illustrated as being generally circular in shape. However, the first portion may be any shape that provides a guiding mechanism for linear motion for the piston rod 34. The second portion 35b is illustrated as also being generally circular in shape extending outwardly from the first portion 35a and inwardly from the pressure tube 22 a sufficient distance as to provide a passage area 51 between the orifice 50 and the bypass valve 52. The passage area 51 may be varied by varying the distance between the pressure tube 22 and the second portion 35b and by varying the length of the distance the second portion 35b extends outwardly from the first portion 35a of the rod guide 35.

Figure 3:
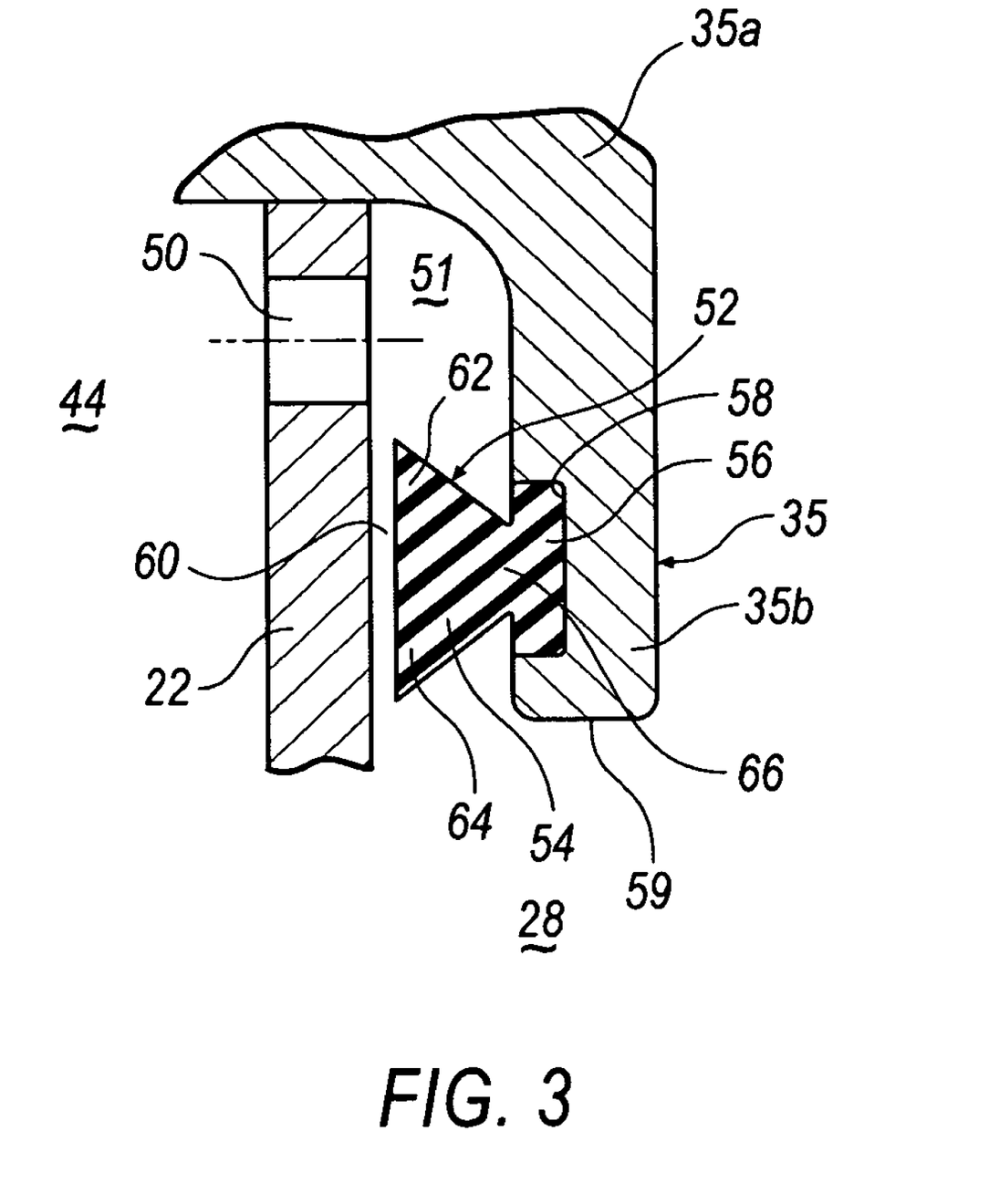
FIG. 3 is a cross-sectional detailed view of detail area 3 of FIG. 2 illustrating one embodiment of a bypass valve.
Figure 4:
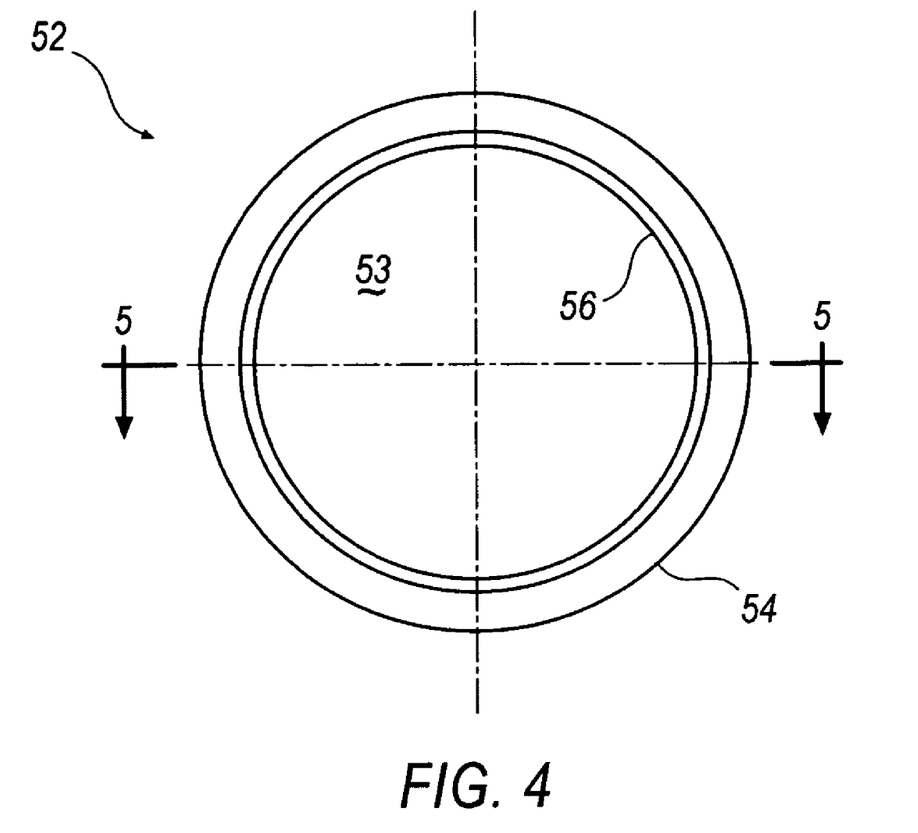
FIG. 4 is a top plan view of the circumferential bypass valve of FIGS. 2 and 3.
Figure 5:
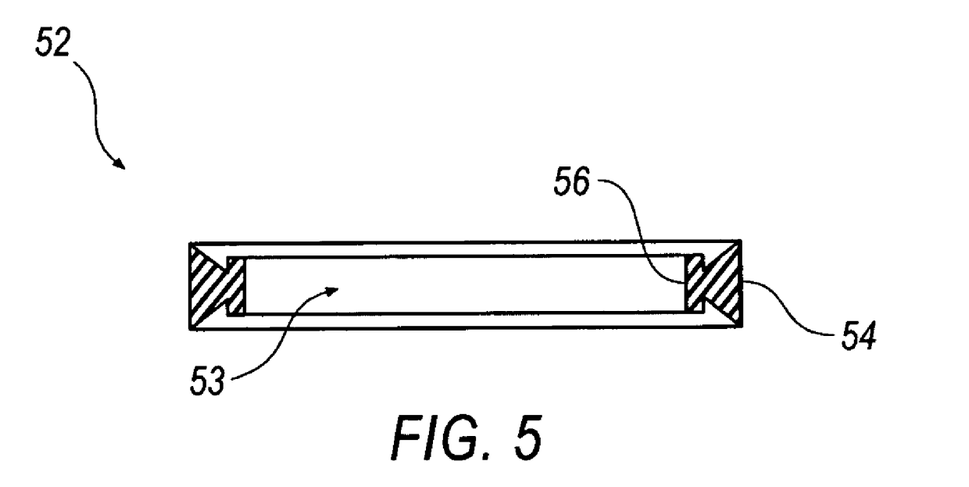
FIG. 5 is a cross-sectional view of the bypass valve of FIG. 4 taken along sectional line 5-5.

As illustrated in FIGS. 3-5, the bypass valve 52 includes a generally annular space defining an aperture 53 (best seen in FIG. 4). The bypass valve 52 further includes an outer portion 54 and an inner portion 56. The inner portion 56 is adapted to be selectively secured to a portion of rod guide 35. In one embodiment, the inner portion 56 is functionally engaged with a receiving portion 58 disposed circumferentially proximate a first end 59 of the rod guide 35. The bypass valve 52 extends outward from the rod guide 35 toward the pressure tube 22. In a normally open position as illustrated in FIG. 3, a gap 60 is disposed between an outer face of the bypass valve 52 and an inner wall of the pressure tube 22. The gap 60 and the orifice 50 cooperate to permit fluid to flow freely between the reservoir chamber 44 and the upper working chamber 28. The bypass valve 52 may be disposed anywhere between the second portion 35b of the rod guide 35 and the orifice 50. In another embodiment, the bypass valve 52 may be secured to the pressure tube 22 and extent toward the second portion 35b of the rod guide 35 (not shown).

As further illustrated in FIG. 3, the bypass valve 52 further includes an upper edge portion 62 and a lower edge portion 64 of the outer portion 54. In a closed position, either the upper edge portion 62 or the lower edge portion 64 is in contact with the pressure tube 22, thereby closing the gap 60 between the reservoir chamber 44 and the upper working chamber 28 as further discussed below. The inner portion 54 and the outer portion 54 may be any size and shape and made from any material including an elastomeric material. The example of the bypass valve in FIG. 3, illustrates the inner portion 56 of the bypass valve 52 being generally rectangular and the outer portion 54 being generally triangular. The generally triangular outer portion 54 of the bypass valve 52 is secured to the inner portion 56 proximate a pivot location 66. The orifice 50 is shown to be generally disposed between the first end 59 and the first portion 35a of the rod guide 35.

Figure 6A:
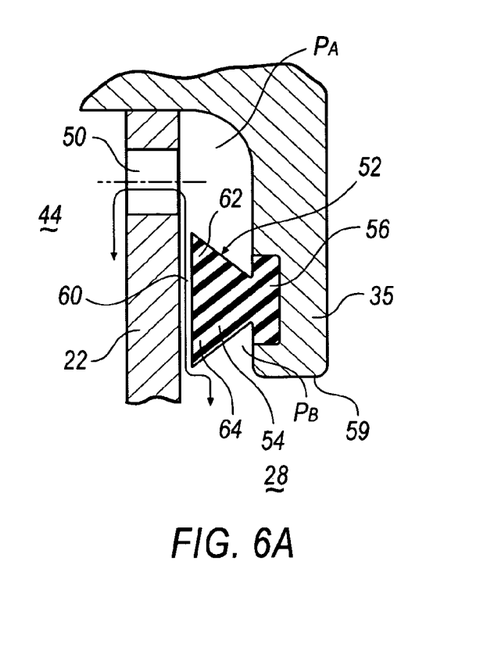
FIG. 6A is a cross-sectional view of the bypass valve of FIGS. 2-4 illustrating the bypass valve in an open position where the pressure above ($P_A$) the bypass valve is generally equal to the pressure below ($P_B$) the bypass valve.
Figure 6B:
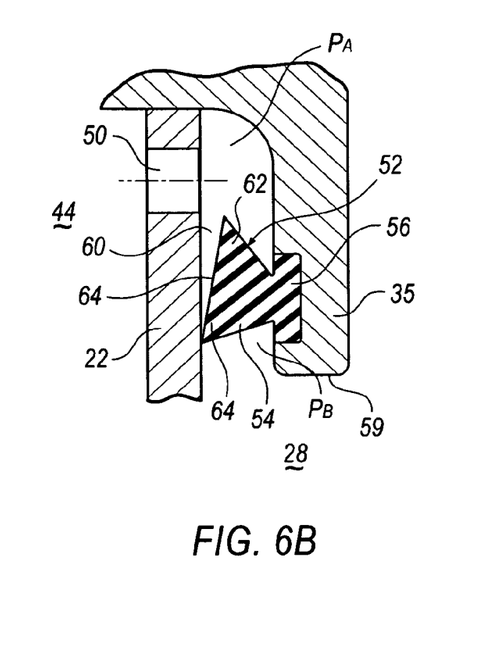
FIG. 6B is a cross-sectional view of the bypass valve of FIGS. 2-4 illustrating the bypass valve in a first closed position where the pressure above ($P_A$) the bypass valve is generally less than the pressure below ($P_B$) the bypass valve.
Figure 6C:
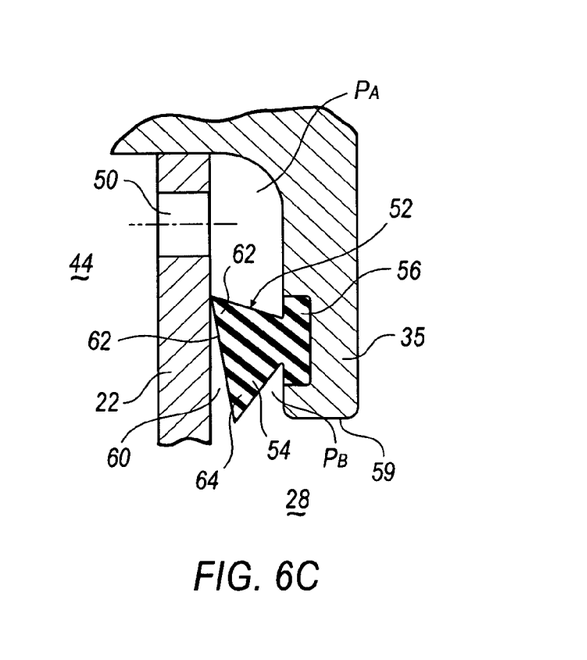
FIG. 6C is a cross-sectional view of the bypass valve of FIGS. 2-4 illustrating the bypass valve in a second closed position where the pressure above ($P_A$) the bypass valve is generally greater than the pressure below ($P_B$) the bypass valve.

FIGS. 6A-6C illustrate use of the shock absorber's internal pressure differential in dampening smaller, generally smooth road vibrations. FIG. 6A illustrates the bypass valve 52 in the normally open position during low velocity operations. The bypass valve 52 is offset from the pressure tube 22 providing the gap 60 for permitting fluid to flow freely between the reservoir chamber 44 and the upper working chamber 28. In the normally open position, the fluid pressure proximate the passage side ($P_A$) of the bypass valve 52 is generally equal to the fluid pressure proximate the piston side ($P_B$) of the bypass valve 52 during low velocity operations.

FIG. 6B illustrates bypass valve 52 in a closed position during a high velocity rebound. The fluid pressure proximate the piston side ($P_B$) of the bypass valve 52 is greater than the fluid pressure proximate the passage side ($P_A$) of the bypass valve 52 causing the bypass valve 52 at the lower edge portion 64 to deflect into the closed position. During high velocity rebound, the fluid pressure proximate the piston side ($P_B$) of the bypass valve 52 causes the lower edge portion 64 of the bypass valve 52 to make contact with the internal wall of the pressure tube 22 closing the gap 60 and preventing the fluid flow between the reservoir chamber 44 and the upper working chamber 28.

FIG. 6C illustrates the bypass valve 52 in a closed position during a high velocity jounce. The fluid pressure proximate the piston side ($P_B$) of the bypass valve 52 is lower than the fluid pressure proximate the passage side ($P_A$) of the bypass valve 52 causing the bypass valve 52 at the upper edge portion 62 to deflect into the closed position. During high velocity jounce, the fluid pressure proximate the passage side ($P_A$) of the bypass valve 52 causes the upper edge portion 62 of the bypass valve 52 to make contact with the internal wall of the pressure tube 22 closing the gap 60 and preventing the fluid flow between the reservoir chamber 44 and the upper working chamber 28.

Figure 7:
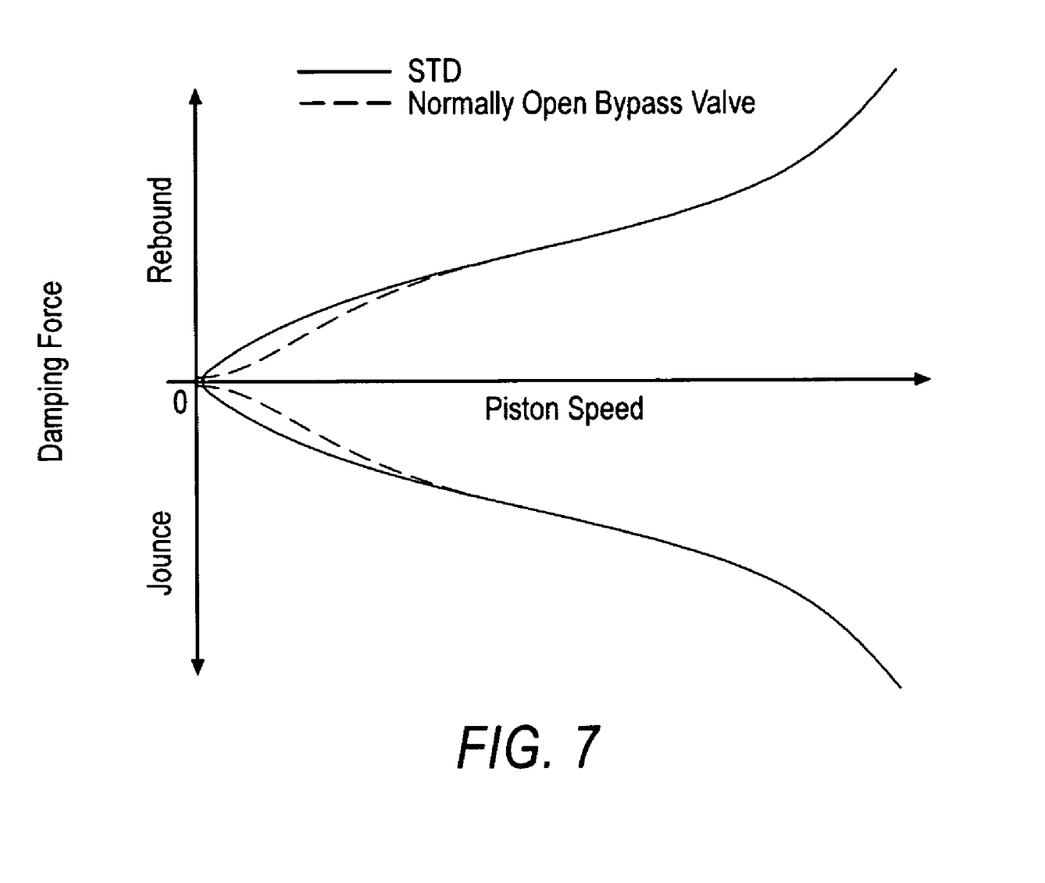
FIG. 7 is a chart illustrating the effect on dampening force in relation to piston speed and the effect of having a normally open bypass valve during jounce and rebound.

FIG. 7 is an exemplary chart illustrating the effect on dampening force in relation to piston speed and the effect of having a normally open bypass valve 52 during jounce and rebound. During low velocity operations, the shock absorber's internal pressure differential, which is related to a combination of displacement, velocity, and acceleration, provides a reduced jounce and rebound compared to a standard shock absorber without the bypass valve 52.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A dampening mechanism comprising:
   a pressure tube defining a working chamber between a rod guide proximate a first end and an end cap proximate a second end;
   a piston disposed within the pressure tube, the piston dividing the working chamber into an upper working chamber and a lower working chamber;
   a piston rod secured to the piston;
   a reservoir tube surrounding the pressure tube defining a reservoir chamber between the reservoir tube and the pressure tube;
   at least one passage disposed through the pressure tube between the reservoir chamber and the working chamber; and
   a selectively operable bypass valve disposed within the pressure tube and between the piston and the at least one passage, wherein the bypass valve includes a first portion selectively secured to the rod guide and a second portion that pivots about the first portion between an open position and at least one closed position,
   wherein the bypass valve is in the closed position when a pressure in the working chamber is greater than a pressure in the reservoir tube by at least a threshold amount, the bypass valve is in the closed position when the pressure in the reservoir tube chamber is greater than the pressure in the working chamber by at least the threshold amount, and the bypass valve is in the open position whenever a pressure differential between the working chamber and reservoir tube is less than the threshold amount.

2. The dampening mechanism of claim 1, wherein the at least one passage is disposed proximate the upper working chamber.

3. The dampening mechanism of claim 1, wherein the at least one passage is disposed between the rod guide and the bypass valve.

4. The dampening mechanism of claim 1, wherein the bypass valve is flexible and cooperates with a portion of the pressure tube to define a gap between the bypass valve and the pressure tube in an open position.

5. The dampening mechanism of claim 1, wherein a radial cross-section of the second portion has a generally triangular shape.

6. The dampening mechanism of claim 1, wherein the bypass valve allows fluid to flow freely between the reservoir chamber and the working chamber in the open position only when a pressure difference between a piston side of the bypass valve and a passage side of the bypass valve is less than a threshold amount.

7. The dampening mechanism of claim 6, wherein the bypass valve is in the open position in response to low velocity piston movement in both a direction toward the rod guide and a direction away from the rod guide and in response to the piston being stationary.

8. The dampening mechanism of claim 7, wherein the bypass valve is in a closed position only in response to high velocity rebound and high velocity jounce.

9. A dampening mechanism comprising:
a pressure tube defining a working chamber between a rod guide proximate a first end and an end cap proximate a second end;
a piston disposed within the pressure tube, the piston dividing the working chamber into an upper working chamber and a lower working chamber;
a piston rod secured to the piston and guided by the rod guide;
a reservoir tube surrounding the pressure tube defining a reservoir chamber between the reservoir tube and the pressure tube;
at least one passage disposed through the pressure tube between the reservoir chamber and the working chamber; and
an elastomeric bypass valve disposed within the pressure tube and between the piston and the rod guide, the bypass valve cooperating with a portion of the valve pressure tube to define a gap between the bypass valve and the pressure tube in an open position whenever the piston is stationary or moving with a velocity less than a predetermined velocity, the bypass valve including a first portion selectively secured to the rod guide and a second portion that pivots between the open position and a closed position when piston is moving the predetermined velocity or faster in each of a direction away from the rod guide and an opposing direction toward the rod guide.

10. The dampening mechanism of claim 9, wherein the bypass valve allows fluid to flow freely between the reservoir chamber and the working chamber in the open position whenever and only when a pressure difference between a piston side of the bypass valve and a passage side of the bypass valve is less than a threshold amount.

11. The dampening mechanism of claim 9, wherein the bypass valve is in the open position resulting from low velocity rebound and low velocity jounce.

12. The dampening mechanism of claim 11, wherein the bypass valve is in the closed position resulting from high velocity rebound and high velocity jounce.

13. The dampening mechanism of claim 9, wherein the bypass valve is in the closed position when a first pressure proximate a piston side of the bypass valve is greater than a second pressure proximate a passage side of the bypass valve by a threshold amount or more.

14. The dampening mechanism of claim 13, wherein the bypass valve is in the closed position when the first pressure proximate the piston side of the bypass valve is less than the second pressure proximate the passage side of the bypass valve by a threshold amount or more.

15. A dampening mechanism comprising:
a pressure tube defining a working chamber between a rod guide proximate a first end and an end cap proximate a second end;
a piston disposed within the pressure tube, the piston dividing the working chamber into an upper working chamber and a lower working chamber;
a piston rod secured to the piston and guided by the rod guide;
a reservoir tube surrounding the pressure tube defining a reservoir chamber between the reservoir tube and the pressure tube;
at least one passage disposed through the pressure tube between the reservoir chamber and the working chamber; and
an elastomeric bypass valve disposed between piston and the at least one passage, the bypass valve cooperating with a portion of the pressure tube to define a gap between the bypass valve and the pressure tube in an open position, the bypass valve including a first portion selectively secured to the rod guide and a second portion that pivots between three consecutive positions including the open position and first and second closed positions at opposing pivotal extremes;
whereby the bypass valve is in the open position resulting from low velocity piston operation and the bypass valve is in the first and second closed positions resulting from high velocity piston operation.

16. The damping mechanism of claim 1, wherein the entire bypass valve is disposed between the at least one passage and the piston when in the open position so as not to overlay any portion of the at least one passage.

17. The damping mechanism of claim 1, wherein the bypass valve includes a first contact point which contacts the pressure tube when the pressure in the working chamber is greater than the pressure in the reservoir by at least the threshold amount and a second contact which contacts the pressure tube when the pressure in the reservoir is greater than the pressure in the working chamber by at least the threshold amount, the second contact point axially spaced from the first contact point.

18. The damping mechanism of claim 17, wherein the first contact point is spaced from the pressure tube when the bypass valve is in the second closed position and the second contact point is spaced from the pressure tube when the bypass valve is in the first closed position.

19. The damping mechanism of claim 14, wherein the bypass valve includes only two pressure tube contacts points including a first pressure tube contact point and a second contact pressure tube point axially spaced from the first contact point, and wherein only one of the first and second contact points contacts the pressure tube when the bypass valve is in the closed position.

* * * * *